US005108618A

United States Patent [19]

Hirasawa

[11] Patent Number: 5,108,618

[45] Date of Patent: Apr. 28, 1992

[54] METHOD OF AND APPARATUS FOR MODIFYING FUEL

[76] Inventor: Nobuo Hirasawa, No. 4-IO-205, Minami-cho 2-chome, Nagaoka-shi, Niigata-ken, Japan

[21] Appl. No.: 641,400

[22] Filed: Jan. 15, 1991

[30] Foreign Application Priority Data

Oct. 30, 1990 [JP] Japan ............................ 2-113926[U]
Oct. 31, 1990 [JP] Japan ................................ 2-294830

[51] Int. Cl.[5] ............................................ B01D 15/04

[52] U.S. Cl. .................................. 210/689; 210/807; 210/263; 210/287; 210/500.1; 210/500.26; 210/510.1

[58] Field of Search .............. 210/660, 661, 679, 686, 210/689, 807, 263, 287, 500.1, 500.26, 510.1; 280/830; 123/27 R; 55/523

[56] References Cited

U.S. PATENT DOCUMENTS

| | | | |
|---|---|---|---|
| 4,150,639 | 4/1979 | Buzek | 123/25 B |
| 4,251,239 | 2/1981 | Clyde et al. | 210/505 |
| 4,363,644 | 12/1982 | Sato et al. | 55/523 |
| 4,533,986 | 11/1985 | Ciliberti et al. | 55/523 |
| 4,629,483 | 12/1986 | Stanton | 55/523 |
| 4,716,024 | 12/1987 | Pera | 210/222 |
| 4,765,833 | 9/1988 | Narumiya et al. | 210/510.1 |
| 4,883,507 | 11/1989 | Rey et al. | 55/523 |
| 4,894,160 | 1/1990 | Abe et al. | 55/523 |

*Primary Examiner*—Robert A. Dawson
*Assistant Examiner*—David Reifsnyder
*Attorney, Agent, or Firm*—Sughrue, Mion, Zinn, Macpeak & Seas

[57] ABSTRACT

A filter device for filtering hydrocarbon fuel, such as gasoline, includes a filter device having a ceramic material which can activate water. The hydrocarbon fuel which is passed through the ceramic material can be activated by the ceramic material. The ceramic material may comprise ceramic particles housed in the filter body, or a powdery ceramic material attached to the filter body, which comprises an elastic network body having interconnected spaces communicating with each other.

9 Claims, 3 Drawing Sheets

METHOD OF AND APPARATUS FOR MODIFYING FUEL

BACKGROUND OF THE INVENTION

1. Field of the Invention:

The present invention relates to a method of and an apparatus for modifying fuel such as gasoline, gas oil, or the like.

2. Prior Art:

To protect the environment from exhaust gases emitted from various industrial machines such as automobiles, there have recently been proposed various devices for removing undesirable or harmful constituents such as $CO_2$, CO, HC, NOx, SOx, etc. from the exhaust gases.

One attempt which has been proposed is to modify fuel, e.g., gasoline, under intensive magnetic and electric fields acting thereon so that the modified gasoline can completely be burned by automobile engines. However, the proposal requires a costly and complex mechanism for developing intensive magnetic and electric fields to act on the gasoline, and has not proven sufficiently effective. Another problem is that since the proposed device is energized by the battery of an automobile, it consumes an additional amount of electric energy stored in the battery. Actually, only some enthusiastic people are finding use of the proposed arrangement for modifying gasoline.

SUMMARY OF THE INVENTION

It is an object of the present invention to provide a method of and an apparatus for modifying a fuel such as gasoline into a fuel which can completely be burned with ease.

According to the present invention, there is provided a method of modifying fuel, comprising the steps of placing a ceramic material which can activate water in a casing, and passing hydrocarbon fuel through the casing, thereby to modify the hydrocarbon fuel into activated fuel.

According to the present invention, there is also provided an apparatus for modifying fuel, comprising a filter device for filtering hydrocarbon fuel, the filter device having a ceramic material which can activate water, whereby the hydrocarbon fuel can be activated by the ceramic material.

The ceramic material may comprise ceramic particles housed in the filter body, or a powdery ceramic material attached to the filter body, which comprises an elastic network body having interconnected spaces communicating with each other.

According to the present invention, there is further provided a fuel tank for storing hydrocarbon fuel, comprising a casing, a three-dimensional elastic network body disposed in the casing, the elastic network body being made of foamed soft polyurethane having interconnected spaces communicating with each other, and a powdery ceramic material which can activate water, the powdery ceramic material being attached to the elastic network body.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
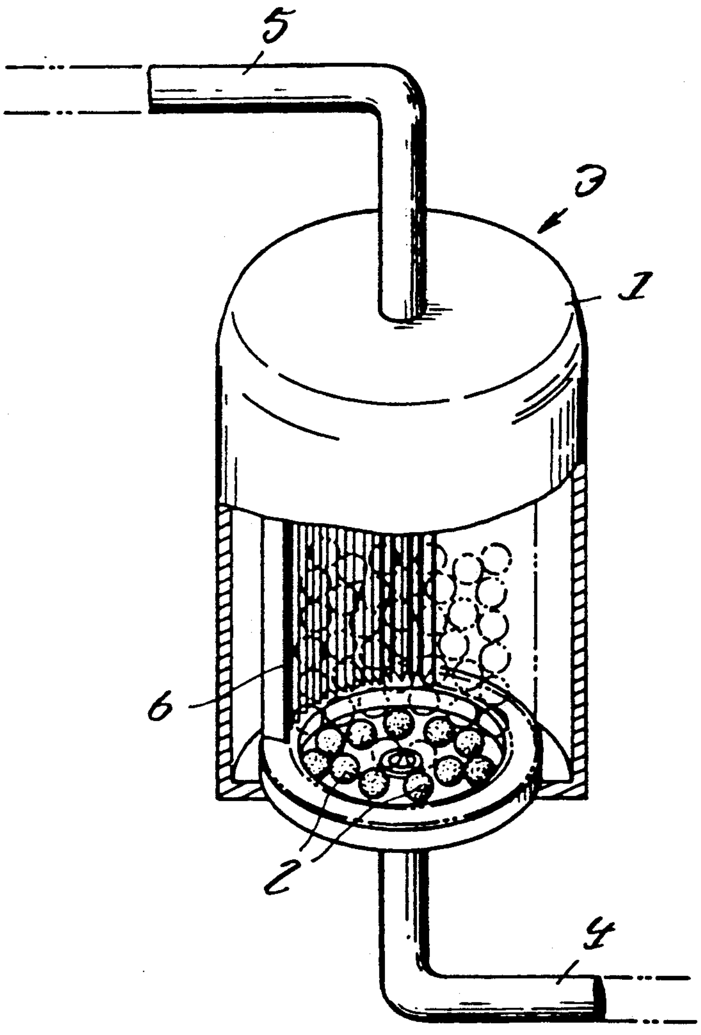
FIG. 1 is a perspective view, partly cut away, of an apparatus for modifying fuel according to an embodiment of the present invention.

Prior to describing specific preferred embodiments of the present invention, the principles of the present invention will first be described below for a better understanding of the invention.

All hydrocarbon fuels are of a stable cluster of molecules kept together at positive and negative potentials. When a ceramic material is brought into repeated contact with a cluster of hydrocarbon molecules, since the ceramic material can activate water, these molecules are separated from each other by the ceramic material, and hence the fuel is activated. The fuel, which is separated into individual molecules, has a greatly increased area for contact with oxygen, and can completely burned when combined with oxygen.

The properties of the ceramic material which activates water will be described below.

When a material having a polar crystalline structure such as tourmaline is broken into small particles, it will remain polarized on the opposite ends of a crystal however small the particles may be. Such a material (which may be any material having permanent poles and exhibiting properties similar to those of tourmaline) is pulverized and mixed with alumina and silica which are dielectric, and the mixture is sintered. The sintered material is then crushed into a granular or powdery ceramic material, which is capable of activating water due to a polar reaction between countless small poles on the particles and water molecules.

Basically, tourmaline is any of borosilicate minerals. Tourmaline belongs to a trigonal or hexagonal hemimorphic hemihedral group, and exhibits vertically assymetric hemimorphy. A typical tourmaline is expressed by the following formula:

$$3\{NaX_3Al_6(BO_3)_3Si_6O_{18}(OH_9F)_4\}.$$

$$(X=Mg, Fe, Li, etc).$$

Depending on the X contained in the tourmaline, it shows various colors such as non-color, red, yellow, green, blue, purple, brown, black, etc.

Tourmaline has a specific gravity ranging from 3.1 to 3.2, and a Mohs hardness ranging from 7.0 to 7.5, indicating that tourmaline is slightly harder than quartz but soft for gems.

The most important feature of tourmaline does not lie in piezoelectricity or pyroelectricity, but in the fact that tourmaline has an ionic bond structure with the center of ion molecules being fixed in a position off the position where it should be, resulting in a polar crystal which has permanent poles such that a particle thereof, however small it may be, remains polarized on opposite ends thereof, just like permanent poles of a permanent magnet.

The poles of tourmaline are effective to activate water which is brought into to contact therewith.

The granular or powdery ceramic material have the following properties:

a) Surface activity

Water, when brought into contact with the particles of the granular or powdery ceramic material, is converted into hydroxyl ion water with many dissociated $OH^-$ ions free from cations. The hydroxyl ion water is in an electro-chemically unstable activated state.

The hydroxyl ion ($OH^-$) water causes surface activities including infiltration, colloidization, dispersion, emulsification, and nonadherence.

This means that surface active water can be produced without use of a chemical.

b) Gradual oxidation and reduction

When placed in an electric field below an electrolytic pressure, water is dissociated as follows:

$$H_2O \rightleftharpoons H^+ + OH^-.$$

$OH^-$ and hydrogen which are produced cause gradual oxidation and reduction, and also exhibit a bleaching c) Increasing dissolved oxygen Since hydroxyl ions ($OH^-$) are in the activated unstable state, they eventually become oxygen and water, increasing dissolved oxygen.

d) Lessening irritant actions of chlorine

Chlorine is responsible for a chlorine odor and taste of tap water, an irritant action of water in pools, and brown rust in water supply pipes. The granular or powdery ceramic material promotes hydrolysys of $Cl_2$ (molecules), greatly reducing the irritant actions of chlorine.

e) PH neutralization

Irrespective of whether water is acid or alkaline, the granular or powdery ceramic material can help neutralize the PH value of the water, and therefore is effective to reduce pollutions caused by waste water.

f) Coagulation and separation

Small particles which have been colloided and dispersed by a surface active effect coagulate into a larger particle, which needs to be separated from water by sedimentation or filtering. Ionization or OH crosslinking of oxides of alumina or silica contained in the granular or powdery ceramic material, which are not easily ionized in nearly neutral water, is accelerated by the polar action of the granular or powdery ceramic material, resulting in an active silica polymer which can easily be separated.

g) Electrodeposition of heavy-metal ions

The countless poles on the surfaces of the particles of the granular or powdery ceramic material are effective in electrically strongly attracting metal ions, causing the metal to be electrodeposited on the polar surfaces. Particularly, an electrically conductive metal is strongly electrodeposited more quickly and strongly than with the conventional chemical bonding. The granular or powdery ceramic material is useful in the removal of heavy-metal ions.

FIG. 1 shows a fuel modifying apparatus according to an embodiment of the present invention. The fuel modifying apparatus includes a filter device 3 for use in an automobile, the filter device 3 having a cylindrical casing 1. The casing 1 houses therein a cylindrical filter body 6 housing therein a number of ceramic particles 2 each having a diameter of several millimeters. The ceramic particles 2 should preferably occupy 80% of the volume of the filter body 6.

Fuel, e.g., gasoline, is supplied from a fuel tank (not shown) through an inlet pipe 5 into the casing 1. Modified gasoline is delivered from the casing 1 through an outlet pipe 4 to a carburetor (not shown).

In operation, the gasoline supplied to the filter device 3 is purified thereby and also modified by the ceramic particles 2. When the modified gasoline is burned by the engine of the automobile, the fuel consumption rate of the engine is improved, and carbons produced by the engine are reduced. In addition, the exhaust gases emitted from the engine are cleaned, the output power of the engine is increased, and the lubricating oil in the engine is pre vented from being degraded soon. The result of an experiment shows that the consumption of the modified gasoline by the engine was about 10% reduced.

The above various advantages resulting from the use of the modified gasoline have been confirmed by the finding of reduced carbons, NOx, $CO_2$, HC, CO, SOx, etc. contained in analyzed exhaust gases emitted from the engine.

The mechanism of the modification (activation) of the gasoline by the ceramic particles 2 is based on the Van de Waals's theory (attraction between molecules).

The fuel modifying apparatus according to the present invention is simpler and allows a higher fuel combustion efficiency than with the conventional arrangement which employs magnetic and electric fields for increased fuel combustion efficiency.

Figure 2:
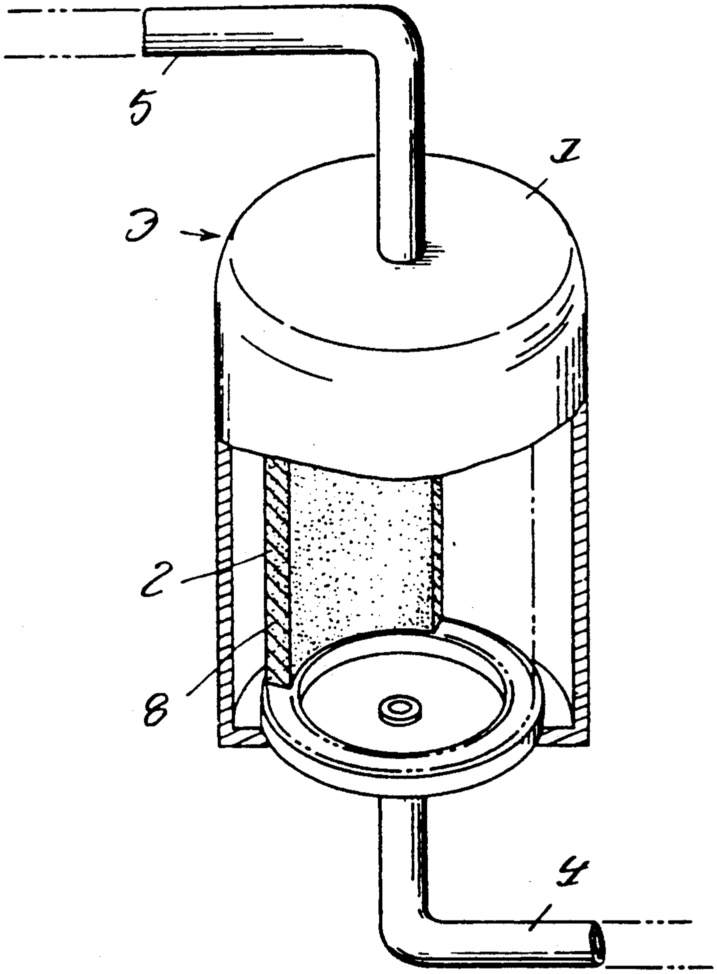
FIG. 2 is a perspective view, partly cut away, of an apparatus for modifying fuel according to another embodiment of the present invention.

FIG. 2 illustrates a fuel modifying apparatus according to another embodiment of the present invention. The fuel modifying apparatus shown in FIG. 2 differs from the fuel modifying apparatus shown in FIG. 1 in that the filter device 3 has, in place of the filter body 6, a three-dimensional porous elastic or spongy network body 8 of foamed soft polyurethane which has interconnected spaces or interstices 7 (FIG. 3) communicating with each other, and a powdery ceramic material 2 attached to the porous elastic network body 8. The powdery ceramic material 2 is produced by pulverizing the ceramic particles 2 shown in FIG. 1. The elastic network body 8 is in the form of a hollow cylinder.

The elastic network body 8 may comprises a body of "Everlight SF" manufactured by Bridgestone Tire Co. Ltd., which is impregnated with a binder that is insoluble in gasoline. After the body of "Everlight SF" is impregnated with the binder, the powdery ceramic material 2 is sprayed thereon.

The powdery ceramic material 2 is prepared by mixing powder of alumina and silica whose particles have a diameter ranging from 0.3 μm to 0.5 μm and powder of tourmaline whose particles have a diameter of about 3 μm, sintering the mixture, and then pulverizing the sintered body into power whose particles have a diameter ranging from 10 μm to 20 μm.

Rather than spraying the powdery ceramic material 2 on the body of "Everlight SF", it may be mixed with melted polyurethane in the process of manufacturing "Everlight SF".

Figure 3:
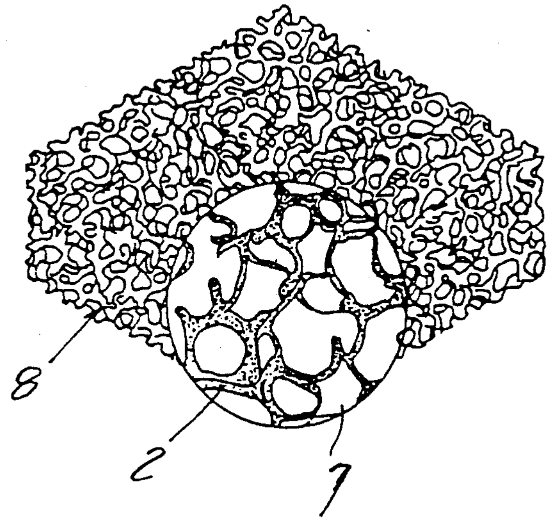
FIG. 3 is a perspective view, partly on an enlarged scale, of a filter employed in the apparatus.
Figure 4:
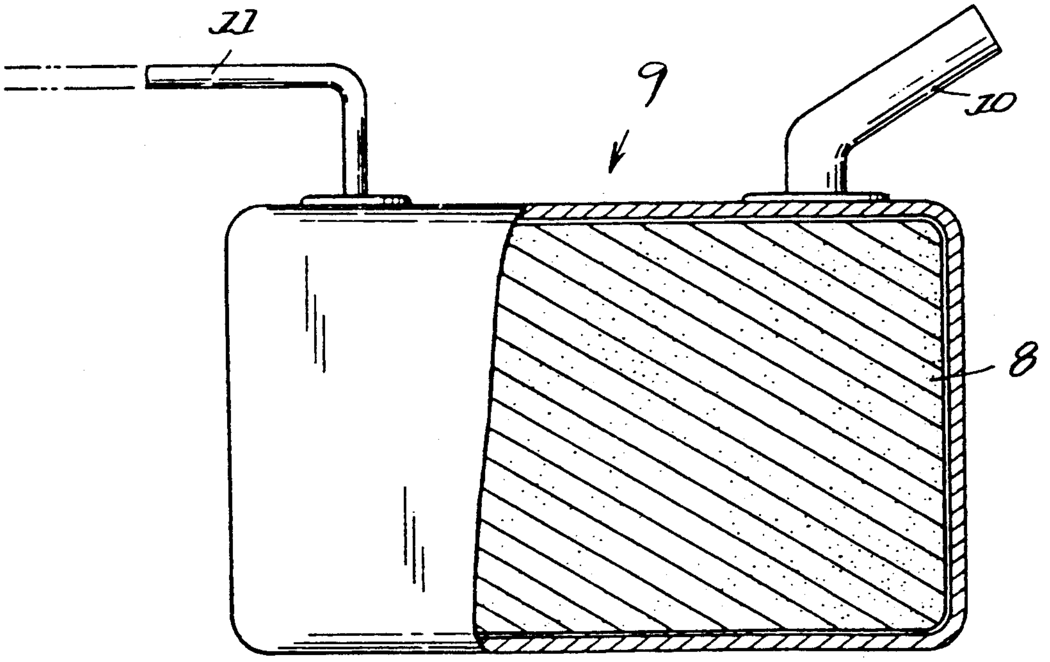
FIG. 4 is an elevational view, partly cut away, of an apparatus for modifying fuel according to still another embodiment of the present invention.

FIG. 4 shows a fuel modifying apparatus according to still another embodiment of the present invention, the fuel modifying apparatus being incorporated in a fuel tank 9 for an automobile. The fuel tank 9 has a casing filled with the elastic network body 8 to which the powdery ceramic material 2 is attached, as shown in FIG. 3. Gasoline is supplied to the gasoline tank 9 through an inlet pipe 11, and delivered from the gasoline tank 9 through an outlet pipe 10 to an engine (not shown).

While an automobile incorporating the fuel tank 9 is running, the gasoline in the fuel tank 9 is brought into good contact with the powdery ceramic material 2 because of vibration and swinging movement of the automobile. Therefore, the gasoline can efficienty be activated by the powdery ceramic material 2.

Since the elastic or spongy network body 8 is disposed fully in the fuel tank 9, even when the fuel tank 9 is broken or damaged in a traffic accident or the like, the gasoline is prevented by the elastic network body 8 from flowing out of the fuel tank 9 through possible cracks. The fuel tank 9 is therefore safeguarded against dangers which would otherwise be caused by leakage of the gasoline.

Although certain preferred embodiments have been shown and described, it should be understood that many changes and modifications may be made therein without departing from the scope of the appended claims.

What is claimed is:

1. A method of modifying fuel, comprising the steps of:

placing a tourmaline ceramic material in a casing; and passing hydrocarbon fuel through said casing.

2. An apparatus for modifying fuel, comprising:

a filter device for filtering hydrocarbon fuel, said filter device having a tourmaline ceramic material disposed therein.

3. An apparatus according to claim 2, wherein said filter device comprises a casing, and a filter body disposed in said casing, said ceramic material comprising ceramic particles housed in said filter body.

4. An apparatus according to claim 3, wherein each of said ceramic particles has a diameter of several millimeters.

5. An apparatus according to claim 2, wherein said filter device comprises a casing, and a filter body disposed in said casing, said ceramic material comprising a powdery ceramic material attached to said filter body.

6. An apparatus according to claim 5, wherein said filter body comprises an elastic network body having inter connected spaces communicating with each other.

7. An apparatus according to claim 6, wherein said elastic network body is made of foamed soft polyurethane.

8. An apparatus according to claim 5, wherein said powdery ceramic material is composed of particles whose diameter ranges from 10 μm to 20 μm.

9. A fuel tank for storing hydrocarbon fuel, comprising:

a casing;

a three-dimensional elastic network body disposed in said casing, said elastic network body being made of foamed soft polyurethane having interconnected spaces communicating with each other; and a tourmaline ceramic material, said ceramic material being attached to said elastic network body.

* * * * *